(12) United States Patent
Liu

(10) Patent No.: US 11,671,533 B1
(45) Date of Patent: *Jun. 6, 2023

(54) PROGRAMMING/DATA SETS VIA A DATA-COMMUNICATIONS SERVER

(71) Applicant: 8x8, Inc., Campbell, CA (US)

(72) Inventor: Zhishen Liu, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/352,556

(22) Filed: Jun. 21, 2021

Related U.S. Application Data

(63) Continuation of application No. 15/443,859, filed on Feb. 27, 2017, now Pat. No. 11,044,365, which is a continuation-in-part of application No. 15/240,391, filed on Aug. 18, 2016, now Pat. No. 10,404,759, and a continuation-in-part of application No. 15/240,457, filed on Aug. 18, 2016, now Pat. No. 10,135,974.

(60) Provisional application No. 62/353,977, filed on Jun. 23, 2016, provisional application No. 62/353,971, filed on Jun. 23, 2016.

(51) Int. Cl.
| | |
|---|---|
| *H04M 3/00* | (2006.01) |
| *H04M 3/51* | (2006.01) |
| *H04M 7/00* | (2006.01) |
| *G06F 8/30* | (2018.01) |
| *G06F 16/951* | (2019.01) |

(52) U.S. Cl.
CPC ........... *H04M 3/5141* (2013.01); *G06F 8/311* (2013.01); *G06F 16/951* (2019.01); *H04M 3/5183* (2013.01); *H04M 7/006* (2013.01)

(58) Field of Classification Search
CPC .................. H04L 65/102; H04L 65/1059
See application file for complete search history.

(56) References Cited

U.S. PATENT DOCUMENTS

| | | | |
|---|---|---|---|
| 5,312,016 A | 5/1994 | Brennan et al. | |
| 5,390,232 A | 2/1995 | Freeman et al. | |
| 6,304,649 B1 | 10/2001 | Lauzon et al. | |
| 6,314,402 B1 | 11/2001 | Monaco et al. | |
| 6,643,362 B2 | 11/2003 | Hogan et al. | |
| 6,772,210 B1 | 8/2004 | Edholm | |
| 6,829,348 B1 | 12/2004 | Schroeder | |
| 7,274,684 B2 | 9/2007 | Young et al. | |

(Continued)

FOREIGN PATENT DOCUMENTS

| | | | | |
|---|---|---|---|---|
| CN | 1247665 A | * | 3/2000 | ............. H04L 29/06 |
| WO | 0135579 A1 | | 5/2001 | |
| WO | WO-0219732 A1 | * | 3/2002 | ......... H04L 65/1006 |

OTHER PUBLICATIONS

"Cisco Hosted Unified Communications Services", Cisco Product Data Sheet, Jun. 18, 2007 (retrieved May 31, 2016) http://www.cisco.com/c/en/us/products/collateral/unified-communications/product_data_sheet0900aecd80670040.html.

*Primary Examiner* — Richard G Keehn
(74) *Attorney, Agent, or Firm* — Crawford Maunu PLLC

(57) ABSTRACT

Certain aspects of the disclosure are directed to programming of a data-communications system. According to a specific example, a data-communications (e.g., VoIP) server is configured to identify, in response to received calls from endpoint devices, a set of scripts written in a programming language that includes call flow commands. The server is further configured to execute the set of scripts to retrieve data from the data sources and control, in response to the data, call flow for the calls.

20 Claims, 6 Drawing Sheets

(56) References Cited

U.S. PATENT DOCUMENTS

| | | |
|---|---|---|
| 7,403,604 B2 | 7/2008 | Mundra et al. |
| 7,702,792 B2 | 4/2010 | Shaffer et al. |
| 7,711,094 B1 | 5/2010 | Olshansky et al. |
| 7,933,385 B2 | 4/2011 | Dickinson et al. |
| 8,064,909 B2 | 11/2011 | Spinelli et al. |
| 8,401,163 B1 | 3/2013 | Kirchhoff et al. |
| 8,656,417 B2 | 2/2014 | May |
| 8,918,867 B1 | 12/2014 | Salour |
| 8,948,358 B1 | 2/2015 | Rengarajan et al. |
| 8,964,726 B2 | 2/2015 | Lawson et al. |
| 9,065,917 B1 | 6/2015 | Taliancich et al. |
| 9,137,127 B2 | 9/2015 | Nowack et al. |
| 9,160,696 B2 | 10/2015 | Wilsher et al. |
| 9,240,966 B2 | 1/2016 | Wilsher et al. |
| 9,270,833 B2 | 2/2016 | Ballai et al. |
| 9,294,433 B1 | 3/2016 | Salour |
| 9,294,515 B2 | 3/2016 | Sayko |
| 9,306,982 B2 | 4/2016 | Lawson et al. |
| 9,332,119 B1 | 5/2016 | Danis |
| 9,338,064 B2 | 5/2016 | Stratton et al. |
| 9,344,573 B2 | 5/2016 | Wolthuis et al. |
| 9,407,597 B2 | 8/2016 | Lawson et al. |
| 9,426,116 B1 | 8/2016 | Salour |
| 9,455,949 B2 | 9/2016 | Lawson et al. |
| 9,456,008 B2 | 9/2016 | Lawson et al. |
| 9,459,925 B2 | 10/2016 | Lawson et al. |
| 9,459,926 B2 | 10/2016 | Shakirzyanov et al. |
| 9,553,475 B2 | 1/2017 | Boysen, III et al. |
| 9,553,755 B2 | 1/2017 | Anisimov et al. |
| 9,949,000 B1 | 4/2018 | Liu et al. |
| 10,348,902 B1 | 7/2019 | Liu |
| 10,530,935 B1 | 1/2020 | Britt et al. |
| 10,705,690 B1 | 7/2020 | Mehta et al. |
| 2002/0141352 A1 | 10/2002 | Fangman et al. |
| 2003/0128691 A1 | 7/2003 | Bergman et al. |
| 2003/0131132 A1 | 7/2003 | Cheng et al. |
| 2004/0114744 A1* | 6/2004 | Trossen ............... H04L 65/104 379/201.01 |
| 2005/0084088 A1 | 4/2005 | Hamilton |
| 2005/0095981 A1 | 5/2005 | Benco |
| 2005/0164702 A1 | 7/2005 | Carlson et al. |
| 2005/0283368 A1 | 12/2005 | Leung |
| 2006/0031510 A1 | 2/2006 | Beck et al. |
| 2006/0039354 A1 | 2/2006 | Rao et al. |
| 2006/0062376 A1* | 3/2006 | Pickford ............. H04M 3/5233 379/265.12 |
| 2006/0074760 A1* | 4/2006 | Helin ................ G06Q 30/0256 705/14.1 |
| 2006/0209797 A1 | 9/2006 | Anisimov et al. |
| 2006/0221941 A1 | 10/2006 | Kishinsky et al. |
| 2006/0264208 A1 | 11/2006 | Moon et al. |
| 2006/0274723 A1 | 12/2006 | Siyavudeen et al. |
| 2006/0291450 A1 | 12/2006 | Ramachandran et al. |
| 2007/0041527 A1 | 2/2007 | Tuchman et al. |
| 2007/0047531 A1 | 3/2007 | Malhotra et al. |
| 2007/0047571 A1 | 3/2007 | Kandikonda et al. |
| 2007/0091800 A1 | 4/2007 | Corcoran |
| 2007/0115942 A1 | 5/2007 | Money et al. |
| 2007/0189481 A1 | 8/2007 | Cadiz et al. |
| 2007/0223446 A1 | 9/2007 | McMenamy et al. |
| 2007/0232272 A1 | 10/2007 | Gonsalves et al. |
| 2007/0259688 A1 | 11/2007 | Forte |
| 2008/0002820 A1 | 1/2008 | Shtiegman et al. |
| 2008/0063153 A1 | 3/2008 | Krivorot et al. |
| 2008/0095339 A1 | 4/2008 | Elliott et al. |
| 2008/0096504 A1 | 4/2008 | Linkola et al. |
| 2008/0102844 A1 | 5/2008 | Zhu et al. |
| 2008/0125077 A1 | 5/2008 | Velazquez et al. |
| 2008/0175230 A1 | 7/2008 | Brand et al. |
| 2009/0003574 A1 | 1/2009 | Schneider et al. |
| 2009/0023450 A1 | 1/2009 | George et al. |
| 2009/0086950 A1 | 4/2009 | Vendrow et al. |
| 2009/0129374 A1* | 5/2009 | Yurchenko .......... H04L 65/4038 370/352 |
| 2009/0129581 A1 | 5/2009 | Kambli et al. |
| 2009/0201916 A1 | 8/2009 | Caron et al. |
| 2009/0203375 A1 | 8/2009 | Gisby et al. |
| 2009/0238169 A1 | 9/2009 | Dalrymple et al. |
| 2009/0290701 A1 | 11/2009 | Portman et al. |
| 2009/0296687 A1 | 12/2009 | Ramanathan et al. |
| 2010/0128709 A1 | 5/2010 | Liu et al. |
| 2010/0130228 A1 | 5/2010 | Vedrow et al. |
| 2010/0142516 A1 | 6/2010 | Lawson et al. |
| 2010/0232594 A1 | 9/2010 | Lawson et al. |
| 2010/0260170 A1* | 10/2010 | Meranchik .......... H04M 7/0075 370/352 |
| 2010/0267374 A1 | 10/2010 | Armstrong et al. |
| 2011/0119157 A1 | 5/2011 | Sivanathan et al. |
| 2011/0170681 A1 | 7/2011 | Kole et al. |
| 2011/0182418 A1 | 7/2011 | Anisimov et al. |
| 2011/0302557 A1 | 12/2011 | Tatsubori |
| 2011/0320550 A1 | 12/2011 | Lawson et al. |
| 2012/0069131 A1 | 3/2012 | Abelow |
| 2012/0208495 A1 | 8/2012 | Lawson et al. |
| 2012/0304245 A1 | 11/2012 | Lawson et al. |
| 2013/0070757 A1 | 3/2013 | Elliott et al. |
| 2013/0072153 A1 | 3/2013 | Lawson et al. |
| 2013/0212603 A1 | 8/2013 | Cooke et al. |
| 2013/0218547 A1 | 8/2013 | Ostermeyer et al. |
| 2013/0237287 A1 | 9/2013 | Ferren et al. |
| 2013/0238338 A1 | 9/2013 | Kharod et al. |
| 2013/0290494 A1 | 10/2013 | Goudarzi |
| 2013/0304929 A1 | 11/2013 | Fahlgren et al. |
| 2013/0339464 A1* | 12/2013 | Goudarzi ................ H04L 51/48 709/227 |
| 2014/0044123 A1 | 2/2014 | Lawson et al. |
| 2014/0105372 A1 | 4/2014 | Nowack et al. |
| 2014/0173078 A1 | 6/2014 | McCord et al. |
| 2014/0229289 A1 | 8/2014 | Rao et al. |
| 2014/0270108 A1* | 9/2014 | Riahi ...................... H04M 5/00 379/88.01 |
| 2014/0270109 A1 | 9/2014 | Riahi et al. |
| 2014/0331060 A1 | 11/2014 | Hayton |
| 2015/0085997 A1 | 3/2015 | Biage et al. |
| 2015/0135167 A1 | 5/2015 | Berk et al. |
| 2015/0193234 A1 | 7/2015 | Udayakumaran et al. |
| 2015/0331727 A1 | 11/2015 | Mameri et al. |
| 2016/0080220 A1 | 3/2016 | Winningham |
| 2016/0134616 A1 | 5/2016 | Koushik et al. |
| 2016/0134757 A1 | 5/2016 | Ballai et al. |
| 2016/0277587 A1 | 9/2016 | Alexander et al. |
| 2016/0241606 A1 | 10/2016 | Calamera |
| 2016/0295017 A1 | 10/2016 | Zgardovski et al. |
| 2016/0350204 A1 | 12/2016 | Conlon et al. |
| 2016/0352790 A1 | 12/2016 | Hollingsworth et al. |
| 2016/0360033 A1 | 12/2016 | Kocan |
| 2017/0041233 A1* | 2/2017 | Yurchenko ............. H04L 45/00 |
| 2017/0070540 A1 | 3/2017 | Combellas et al. |
| 2017/0075719 A1 | 3/2017 | Scallan et al. |
| 2017/0142256 A1 | 5/2017 | Bjorsell et al. |
| 2017/0187877 A1 | 6/2017 | Smith et al. |
| 2017/0207988 A1 | 7/2017 | Li et al. |
| 2017/0262265 A1 | 9/2017 | Kellicker et al. |
| 2018/0053401 A1 | 2/2018 | Martin et al. |
| 2018/0324093 A1 | 11/2018 | Namjoshi et al. |

\* cited by examiner

PROGRAMMING/DATA SETS VIA A DATA-COMMUNICATIONS SERVER

OVERVIEW

Voice over Internet Protocol (VoIP) use has allowed individuals to make telephone calls using broadband Internet connections in place of traditional telephone lines. A VoIP endpoint device can use a broadband Internet connection to connect to a VoIP server that is managed by a VoIP service provider. The VoIP server can handle call routing and provide other VoIP services for the VoIP endpoint device.

Some VoIP providers customize their services for different customers. This might include customizable auto attendants, call routing, call forwarding, voicemail, or other features. For particularly large clients with many different telephone accounts and numbers, implementing and updating these types of customizations can be a significant undertaking.

The use of VoIP telecommunications services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the telecommunications users.

For business entities, the increased use of VoIP telecommunications services has been particularly complex, largely due to providing the same level of personal features to users from the vantage point of each business entity's telecommunications platform. As examples, a VoIP telecommunications service provider such as 8×8, Inc. can be providing such VoIP services to a multitude of business entities each of which uses the provided services for a customized platform configured to provide telecommunications services to a wide range of employees. For each such customized platform, it can be particularly burdensome for the VoIP telecommunications service provider to adjust and reconfigure the customized platform (of each respective business entity to which such services are being provided) each time a business entity (e.g., as requested by the entity's IT department, employee(s) or changes in terms of the employee's communications equipment/endpoint devices.

SUMMARY

Various example embodiments are directed to issues such as those addressed above and/or others which may become apparent from the following disclosure concerning systems and methods for using VoIP call control for customizable and readily configurable incoming call routing and/or related telecommunications services.

Embodiments are directed toward methods for use in telecommunications systems employing a VoIP server operated by a telecommunications provider, where the VoIP server is on the VoIP provider side such as 8×8, Inc. use to provide VoIP services to a multitude of client entities. In such contexts, the VoIP server may be referred to as a VoIP provider server. In such systems, the VoIP server includes one or more computer processor circuits (configured with access to databases stored in memory circuits) and configured to act as a telecommunications call-control engine for routing, processing calls and/or providing related telecommunications services on behalf of client entities. Such client entities may be exemplified respectively as the above-noted businesses with employees ranging in number from just a few to thousands, and being located/mobile for communications services in any of a multitude of venues.

In these embodiments, such methods use the call-control engine to provide such telecommunications services by receiving VoIP telephone calls from VoIP endpoint devices, and identifying client-specific sets of control data (e.g., providing directives or commands with call processing data) written in a first instruction-configurable/programmable language that is associated with a message exchange protocol that is used between the VoIP call routing server and data sources. Examples of such client-specific sets of control data may include other forms of code providing data and/or instructions over an interface facilitating communication between the telecommunications provider and the VoIP endpoint devices. Such methods execute the client-specific sets of control data to make decisions on how to route calls placed by the VoIP endpoint devices, and to identify a set of instructions (written in a second instruction-configurable/ programmable language) associated with the routing decisions. The first and second programmable languages may be similar, in that both languages are derivatives of a same type of programmable language, but the first and second programmable languages may differ in terms of content and use. The first programmable language may identify call processing directives provided to the telecommunications provider by the client entity, whereas the second programmable language may identify call routing directives as provided by the telecommunications provider. The first and second programming languages are related languages, whether indirectly or directly related via at least one level of translation. For example the first and second programming languages may include or be analogous to, CP++, compiled to assembly/object level code, and a converted to higher-level programming language, among other languages or sets of instructions. Such methods execute the set of instructions to retrieve data from the data sources maintained by the telecommunications provider, and provide, in response to the data, call control functionality for the VoIP calls placed by the endpoint device.

In accordance with certain aspects of the present disclosure, a communications system and/or aspects thereof are directed to a VoIP server operated by a VoIP provider. The communications system includes one or more computer processor circuits coupled to memory circuits and configured to provide a call control engine, where the call control engine is configured to receive VoIP telephone calls from VoIP endpoint devices. The one or more computer processor circuits are configured to identify, in response to the VoIP telephone calls, a set of multi-level scripts written in a programming language that includes call flow commands and a message exchange protocol between the call control server and data sources. The one or more computer processor circuits are configured to execute the set of multi-level scripts to retrieve data from the data sources, and control call flow for the VoIP calls in response to the retrieved data.

These aspects include, for example, client endpoint devices and, respective to each (different and disparately-situated) subscriber/client entity, one or more client computer servers and/or client computer engines. Connectivity between each subscriber/client entity and VoIP server(s), operated by a VoIP communications service provider, can be facilitated by a message exchange protocol which is directly or indirectly used by both the VoIP communications service provider and its clients (or client entities) in order for the clients to readily and routinely update their customizable and client-specific VoIP communications services, without burdensome manual configuration changes at each instance of a change in the client's VoIP communications needs (e.g., whether the client needs concern call routing such as adding a new extension lines for a franchise/branch office or concern data processing issues such as effecting a client's regional-voicemail changes for 1-800 call-processing implementations).

In accordance with one such example, aspects of the instant disclosure are exemplified in the form of a method as operated by a client computer engine for use with such a VoIP server. As indicated above, the VoIP server provides VoIP communications services to a plurality of different and disparately-situated client computer engines respectively operable on behalf of different and disparately-situated client subscribers of the VoIP service provider. The method is operable by one such client computer engine. Each of the VoIP server and the client computer engine include one or more computer processor circuits coupled to memory circuits and configured to provide call control information for communicating data on behalf of VoIP endpoint devices associated with the client computer engine. The method includes at least the following steps: (i) Configuring the client computer engine with routing-decision information and call-processing data. With this step, the routing-decision information and call-processing data are specific to needs of the client, with the client computer engine being configured specifically for the needs of the client. (ii) In response to the VoIP telephone calls, generating data/call-routing commands from a programming language for communicating from the client computer engine, in accordance with a message exchange protocol, to the VoIP server, wherein the data/call-routing commands and the programming language are defined by a VoIP communication platform for the VoIP server to effect routing decisions and communicate data for the VoIP calls/callers. The routing decisions and the communicated data are specific to the client as configured within the client computer engine. (iii) Using the data/call-routing commands in communications to the VoIP server, in accordance with the message exchange protocol, to convey changes or updates of the routing-decision information and call-processing data, wherein the changes or updates of the routing-decision information and call-processing data are also specific to needs of the client.

In a more specific example, the above method includes responding to the changes or updates of the routing-decision information and call-processing data being conveyed to the VoIP server, by monitoring communications from the VoIP endpoint devices and validating the changes or updates.

The above discussion/summary is not intended to describe each embodiment or every implementation of the present disclosure. The figures and detailed description that follow also exemplify various embodiments.

BRIEF DESCRIPTION OF THE FIGURES

The disclosure may be more completely understood in consideration of the following detailed description of various embodiments of the disclosure, in connection with the accompanying drawings in which.

Figure 1:
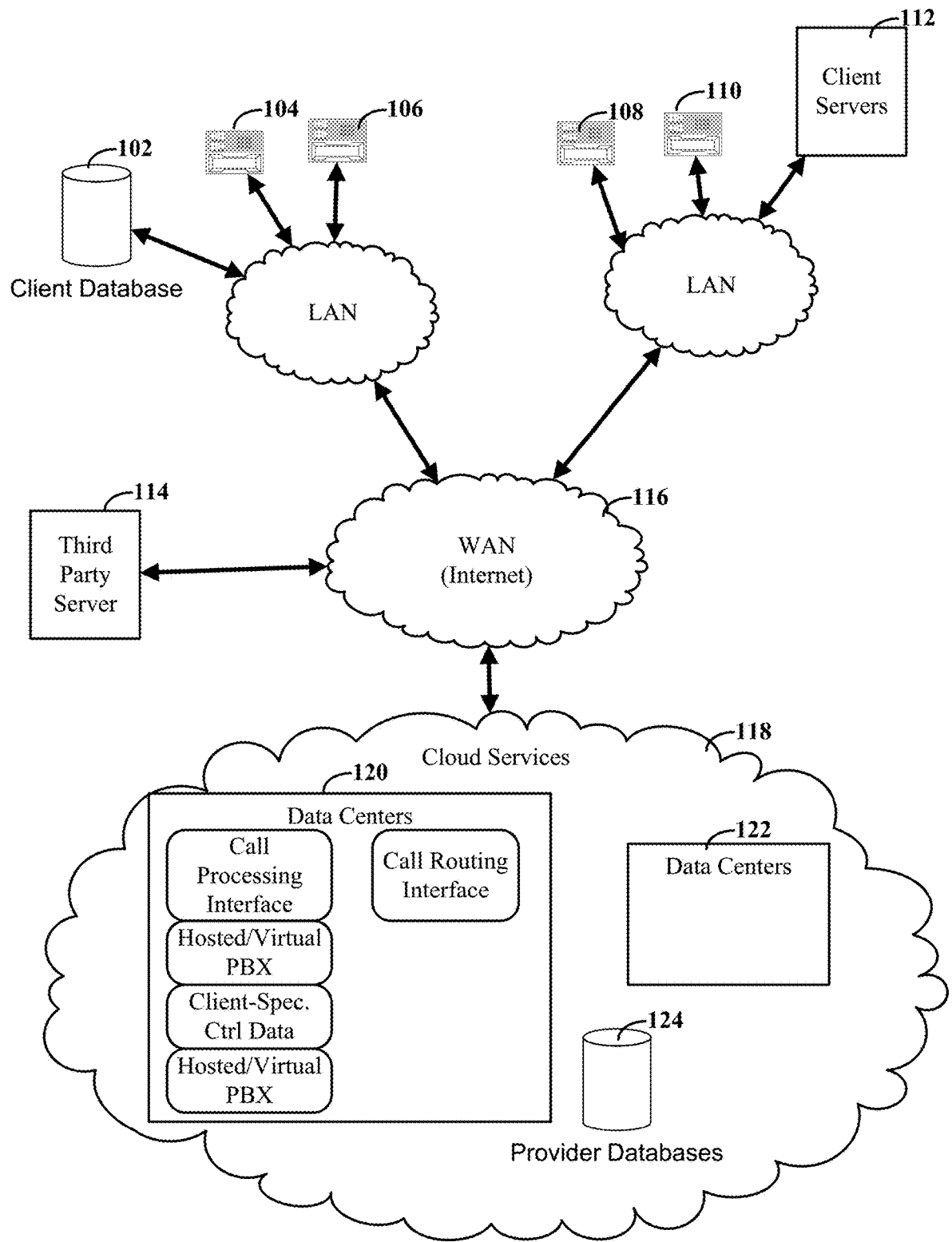
FIG. 1 is a diagram for a system that uses a high-level programming language for call control operations, consistent with embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods involving routing incoming calls relative to a receptionist. In certain implementations, aspects of the present disclosure have been shown to be beneficial when used in the context of providing VoIP communications services. While the present disclosure is not necessarily limited to such VoIP communications systems as described herein, for purposes of facilitating understanding and appreciation of certain embodiments, the following discussion uses such VoIP-based services and systems in the context and on behalf of telecommunications platforms of client entities which subscribe to such services from a VoIP telecommunications service provider (with a server).

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to VoIP communication servers configured to provide VoIP communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

While the present disclosure is not necessarily limited to such embodiments, certain embodiments are disclosed and/or illustrated in connection with cloud-based data centers that provide a PaaS that is built upon a system that provides VoIP telephone service. Various embodiments are directed to VoIP telephone service that includes a private branch exchange (PBX). A PBX is a telephone system that switches calls between enterprise users on local lines while allowing all users to share a certain number of external phone lines. External phone lines are telephone lines that are supported by telephone carriers as being individually addressable within the public switched telephone network (PSTN). For example, a PBX can use extensions to direct calls to many phones after a caller first makes a call to a shared number. As another example, a PBX can provide Direct Inward Dialing (DID). DID is a service where a telephone carrier provides a block of telephone numbers that are each routed to a PBX system rather than to individual telephone lines. Using DID, individual phone numbers can be provided to each person or workstation without separate physical lines into the PBX for each possible connection.

According to embodiments, a PaaS can provide a user with access to, among other things, telephone call routing control, PBX functions, computer telephony integration (CTI), and data analytics. Embodiments of the present disclosure are directed toward an interface that allows users of the PaaS solution to access VoIP telephone capabilities of the underlying system, including its hardware and software components, while maintaining the integrity and security of the underlying system. Particular embodiments are directed toward a PaaS solution that allows for VoIP call flow control to be controlled, while also providing the ability to interface with data sources that are either part of the underlying system or external to the PaaS solution.

The ability to access the underlying VoIP services, including call routing and call control engines, can provide a platform that is both flexible and simple to implement from the viewpoints of both the VoIP provider and the customers of the VoIP provider. The PaaS solution can be configured to modify and control the call flow and processing at all levels within the system, including (re)routing of incoming calls to different iPBXs (Internet Protocol Private Branch Exchange or a PBX configured to effect telecommunications over the Internet). When compared to an add-on type service where a call is first handled by a separate iPBX, the PaaS solution may offer a number of advantages and additional features including, but not limited to, increased call routing capabilities, scalability, and reduced complexity. For instance, access to iPBX functions allows for simple call redirection to extensions or DID numbers provided by the iPBX. Moreover, the PaaS solution coordinates and routes calls between multiple iPBXs using an initial call routing switch. Calls initially routed to a particular iPBX can still be rerouted to a different iPBX using the initial call routing switch.

The VoIP servers providing the underlying function for the VoIP system can be configured to utilize a programmable (or configurable) communication protocol such as a high-level, domain-specific programming language as might be implemented with respective VoIP servers providing VoIP call routing and IP PBX functions on respective sides of an interface configured to facilitate the communications via the defined protocol. A particular example of a VoIP server may use session initiation protocol (SIP) to handle various call functions (e.g., call setup and tear down). However, the various embodiments discussed herein are not necessarily limited thereto. Consistent with the above and in other embodiments disclosed herein, the VoIP servers can be configured to establish a leg of the call from the VoIP endpoint devices (or dial peers) to another VoIP endpoint device or to endpoints on the PSTN through use of a VoIP-PSTN gateway.

According to more specific example embodiments, a high-level domain-specific programmable communication protocol (e.g., specific to customer-entity domains) uses one or more languages which are defined using a markup language as the basis for the language structure. Particular implementations relate to the use of at least two domain-specific languages, one that can be used for initial call routing and the other for providing more complex and specific call processing functions. More particular example embodiments use an eXtensible Markup Language (XML). An XML model defines the constraints on the high-level language, including defining the set of valid commands that can be carried out by the VoIP servers. Within these constraints, a customer can write XML code that self-describes the building blocks or particular configurations used in the customer's particular application. For instance, a common set of instructions, written in the high-level language (e.g., an XML language) may be provided by a VoIP provider to client entities. The common set of instructions may form a template to be populated with client-specific directives, the populated template forming client-specific sets of control data that instruct the VoIP provider how a particular client entity is to be configured for various VoIP services. In such a manner, the VoIP provider may provide a lightweight and simplified set of instructions to client entities, and client entities may provide the VoIP provider with instructions to customize the virtual office services for that particular client entity. XML also allows for various different data structures to be embedded into the XML document or file. For example, a script written in JavaScript can be embedded as character data that the VoIP servers are configured to identify and execute. Unless otherwise stated, the use of XML in connection with various embodiments does not necessarily limit the corresponding embodiments, such as limiting the embodiments to the use of only an XML-based language(s). As used herein, such domain-specific programming language(s) are referred to as high-level markup languages (e.g., XML, derivative languages or XML-type languages).

Various examples of such XML derivative languages are exemplified in U.S. patent application Ser. Nos. 15/377,778 and 15/377,797 filed on Dec. 13, 2016, and entitled "Region-based connecting of calls using client-specific control and provisioned numbers" and "Region-based bridging of calls using client-specific control and revised caller identifiers" (respectively) which are fully incorporated by reference herein. In certain example VoIP applications, two XML-type languages are implemented as a call processing XML and a call routing XML, respectively as XML derivative languages corresponding to XML but customized for processing VoIP calls on the side of the interface operating on behalf of customer entities and on the other side of the interface for higher level processing (including, for example, call routing) by the VoIP service provider. For further application-specific examples of such XML-type customization, reference may be made to discussion of client-specific sets of control data and set of instructions as disclosed in U.S. patent application Ser. Nos. 15/377,778 and 15/377,797. Such XML derivative languages can be written specific to types of functionality as needed for various customer entities, thereby allowing developers to program call processing logic or service execution logic with both XML building blocks and JavaScript/TCL, or other scripting languages best suited to levels (e.g., in terms of quantity range) of a customer's endpoint devices and/or in terms of complexity of the VoIP-based media functionality and evolving demands expected by a customer. In certain implementations, XML derivative languages allow VoIP customer developers to program and integrate VoIP call flow (e.g., as provided by a cloud-based VoIP service) with customer or third party application servers and databases. In particular, the call flow can include a connection that is used as part of call routing decisions and call processing options that are related to one or more receptionists that can answer calls to a group of endpoint devices. The system allows different levels of call control logic to be implemented in a manner that can facilitate scalability of the system of large organizations with many endpoint devices and/or end-users and with complex organizational structures that have corresponding complex call routing requirements.

For ease of discussion, various embodiments are discussed in terms of XML, and more particularly, XML derivative languages. The skilled artisan would appreciate that each such XML-type embodiment is not necessarily limited to XML, XML derivative languages, or variants of XML. The corresponding directives, control and related telecommunications data can be provided in documents corresponding to other languages and/or communications protocols; for example, one such programming language can be used for initial call routing and another programming language can be used for providing more complex and specific call processing functions. For more general information regarding implementation and control relating to such client-directed telecommunications services (and more specifically interface/communications implementations), reference may be made to U.S. Patent Application Ser. No. 62/353,971 filed on Jun. 23, 2016, and entitled "Client-Specific Control of Shared Telecommunications Services", U.S. patent application Ser. No. 15/240,391 filed Aug. 18, 2016, and entitled "Client-Specific Control of Shared Telecommunications Services", U.S. Patent Application Ser. No. 62/353,977 filed Jun. 23, 2016, and entitled "Client-Specific Control of Shared Telecommunications Services", and U.S. patent application Ser. No. 15/240,457 filed on Aug. 18, 2016, and entitled "Client-Specific Control of Shared Telecommunications Services", which are fully incorporated by reference herein. As discussed above, instead of or in combination with such XML-type languages, these other implementations may be realized as being suitable for serving telecommunications with different size and/or complexity metrics as needed to provide adequate telecommunications service to customer entities.

According to particular embodiments, an XML engine can respond to a call, or other event, by sending requests to a web server and get XML derivative documents (e.g. a set of instructions) for processing (providing a set of directives or instructions for taking action), thereby operating in a stateless manner that is similar to how an Internet browser, or similar interface uses Hypertext Markup Language (HTML). The XML engine can interpret a received XML derivative document to identify XML building blocks that are then rendered (i.e., executed). Each building block can define logic relating to one or more functions, such as for voice, call control, and flow control logic. The XML engine may also execute other types of code, such as JavaScript, to create dynamic content (e.g., dynamically generated XML-derivative) for client-side flow control. Each XML derivative document may have uniform resource identifier (URI) links to a web server for iterative processing, or it may include query requests for retrieving data from various sources of data. A query could be formatted for consistency with the source of the data (e.g., by using JavaScript Object Notation (JSON) to retrieve data from third party application servers or from the VoIP server provider's cloud database). This information can then be used to drive call flow or call control functionality and decisions.

According to various embodiments, the high-level programming language allows a programmer access to the PaaS solution by way of a controlled and limited set of call control operations and functions. The limitations on the operations can be particularly useful for allowing programming control to be placed into the hands of different customers of the provider of the VoIP servers. For example, the provider can update or make other changes to how the VoIP servers are configured without requiring modification to documents written to use the high-level language, which might otherwise be required to account for the changes. Moreover, the VoIP servers and their data can be protected from poor programming decisions (intentional or otherwise) by tightly controlling the extent that the documents provide control of or access to the inner workings of the VoIP servers.

As applicable to routing decisions relating to receptionists, an incoming call can be processed according to an XML document with instructions (e.g., client-specific sets of control data) for determining whether calls route to a receptionist, directly to a called endpoint device, or are routed and processed in some other manner. As an example, the XML document could include a set of global rules for determining how to handle calls to endpoints of a customer (e.g., a large business with many individuals and corresponding endpoint devices). XML documents can also specify local rules for routing calls (e.g., to endpoint devices, voicemail, auto call attendants), or otherwise processing the call. The local rules might be used if global rules specify that the call is not routed to a receptionist, or if the receptionist rejects or forwards the call on. Each of the local and global rules can be driven, at least in part, by data retrieved from a data source, such as a client server or database. As an example, the global rules could access a customer database that includes lists of caller IDs that are handled differently. The call routing VoIP server does not need to have direct access to the lists of caller IDs (which might be confidential lists and thereby represent a security risk if shared directly with the VoIP server). Rather, the VoIP server can send a query that includes a specific caller ID number of an incoming call. In response to the query, information can be provided that indicates how to process the call (e.g., whether to route the incoming call to a receptionist or directly to the dialed endpoint device).

Consistent with certain embodiments, the VoIP servers can be configured to allow for complex hierarchal solutions that can improve scalability of the system. For example, call control decisions that are shared between certain groups of accounts can share a common set of instructions that can be updated once for all of the groups. The set of instructions can link to other documents that are specifically tailored to individual accounts in order to provide individual customizable options. In such a manner, the first programming language can provide a first level of documents that are used by all VoIP endpoint devices in a group, whereas the second programming language can provide a second level of documents used by a subset of the VoIP endpoint devices.

In various embodiments, the high-level programming language and the VoIP servers that execute the high-level programming language can be configured to interface with other sources of data and control. This can include, for example, flow control decisions that are based upon code running on the client side or on the server side. As non-limiting examples, a client side computer system could run code that is written using JavaScript or TCL while a server-side computer system might run code that is written using PHP, NodeJS, Python, Scala, Ruby, .Net, or other web languages. For example, a customer can write JavaScript applications that are configured to receive call event notifications from the VoIP servers and to generate XML responses that are provided back to the VoIP servers. In some instances, the code can be configured to dynamically modify the XML content of the documents for each call instance.

In some embodiments, the high-level programming language can include commands that allow queries be sent to various databases, whether the database is controlled by the client or VoIP provider. The high-level programming language can also allow for calls to web-based (e.g., HTML) servers or to APIs of the VoIP provider or client.

Consistent with certain embodiments, the call control engine and high-level programming language provide interface options that allow for authorization and authentication services to be accessed and used as part of the call control functions. For example, the high-level programming language can be used to direct the call control engine to access an authentication server that performs verification (and grant) of access rights for certain databases or services.

According to embodiments of the present disclosure, the VoIP servers can be configured to use different high-level programming languages for different functions, where each programming language has a different set of commands. For example, a first high-level programming language can be used to create documents that control call routing decisions for high volumes of call traffic, as might occur at the edge of a VoIP provider's system. These call routing decisions can, for example, identify a particular branch office or an iPBX of a particular customer. The identified iPBX might then have additional documents written to communicate using a second high-level programming language that is tailored toward more specific call processing capabilities that might be associated with a particular account or another identifiable grouping. The distinction between the two programming languages can be particularly useful in terms of improving the scalability of the system. For instance, the language used for call routing decisions can be relatively light weight, with fewer commands and capabilities. In particular implementations, the first (call routing) language can contain a subset of the commands available in the second (call processing) language.

Various embodiments of the present disclosure are directed toward VoIP servers that are designed to provide options for dynamically updating and accessing documents using the high-level programming language. For instance, the VoIP servers can be configured to facilitate uploading of new documents as desired by a customer using an interface to the system. The interface can be configured, as an example, to allow a customer to login and replace or modify the existing client-specific sets of control data.

Consistent with some embodiments, there can be multiple levels of client-specific sets of control data and scripts for a particular client entity. For example, a first template document (e.g., a first set of client-specific control data) might specify call processing functionality for an entire company. A second set of template documents (e.g., a second set of client-specific control data) could be used at a country level. For instance, one template document can be used for the United States and one template document can be used for Canada. A third set of template documents (e.g., a third set of client-specific control data) could then be used for each branch or store of the company. Finally, individual documents could be used for each individual account. The shared, higher-level documents can be updated once for a potentially large number of individual accounts, while still providing a level of individual configurability for each of the accounts. Moreover, the level of the template document in the hierarchal solution may be identified based on an identifiable characteristic of a particular VoIP call. For instance, a call routing decision can identify a customer account, and a particular level of XML derivative language document(s) can be identified, based upon the customer account.

Turning now to the figures, FIG. 1 is a diagram for a system that uses a high-level programming language for call control operations, consistent with embodiments of the present disclosure. In connection with these specifically-illustrated examples, VoIP endpoint devices 104, 106, 108, and 110 are configured to place and receive VoIP telephone calls between other VoIP endpoint devices, and also between non-VoIP endpoint devices (not depicted). The depicted examples of non-VoIP endpoints devices include plain old telephone service (POTS) telephones and cellular-capable devices, which might also be VoIP capable (e.g., smart phones with appropriate VoIP software applications). The various endpoint devices include circuitry that is specially configured to provide calling functions that include interfacing with the appropriate circuitry of the call service provider used by the corresponding endpoint device. In many contexts a VoIP-endpoint device is a VoIP-capable telephone commonly referred to as IP phones. The VoIP-endpoint devices can include, but are not limited to, desktop computers, mobile (smart) phones, laptop computers, and tablets. When each of the endpoint devices originates or receives a call in a telephone network, each can be characterized or referred to as an addressable call endpoint or a dial peer.

The call routing and other services for the VoIP telephone calls can be provided by one or more VoIP servers within the cloud-based system 118 (e.g., configured to provide a PaaS to customers of the VoIP provider). In particular example embodiments, the VoIP servers can be located within one or more data centers 120, 122, which are part of a cloud services system 118. The data centers can be, for example, part of a cloud-based system 118 where the hardware providing the cloud services is located in a number of different data centers with different physical locations. Consistent with embodiments, the cloud services can include SIP servers, media servers, and servers providing other services to both VoIP endpoint devices and the users of the VoIP endpoint devices. In some instances, the various servers, including both the VoIP Servers and data analytic servers discussed herein, can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a VoIP server uses session initiation protocol (SIP) to handle various call functions (e.g., call setup and tear down); however, the various embodiments discussed herein are not necessarily limited thereto. Consistent with the above and other embodiments disclosed herein, the VoIP servers can be configured to establish a leg of the call from the VoIP endpoint devices (or dial peers) to another VoIP endpoint device, or to a gateway.

According to various embodiments, one or more data analytics servers can monitor and analyze call data relating to the VoIP servers and VoIP endpoint devices. For example, a data analytics server can be designed to track call statistics about various different call-related parameters, such as call duration, call date, call time of day, called parties, endpoint devices, selected data centers, selected carriers, dropped calls, transferred calls, voicemail access, conferencing features, and others. The high-level programming language(s) and the VoIP servers executing the languages can access the call summary metrics and the data analytics, which can be stored in a provider database 124. For example, a script running the VoIP server could parse client-specific sets of control data to generate database queries that direct the VoIP server to query, or subscribe to, call length summaries for all calls made to endpoints that are registered with the VoIP server. The script could then use the information to control how calls are routed as well as how different (customer or provider) services are invoked. According to various embodiments, the database queries could be sent to a customer database 102.

Consistent with certain embodiments, the VoIP server can be configured to interface with customer servers 112 or even with third party servers 114. For instance, client-specific sets of control data stored by the cloud-based system 118 can identify, based upon a received call, a Uniform Resource Identifier (URI) that points to customer servers 112 or to a third party server 114. Data provided from these servers, e.g., in the form of client-specific sets of control data, can be used to specify call routing, or other functions.

Figure 2:
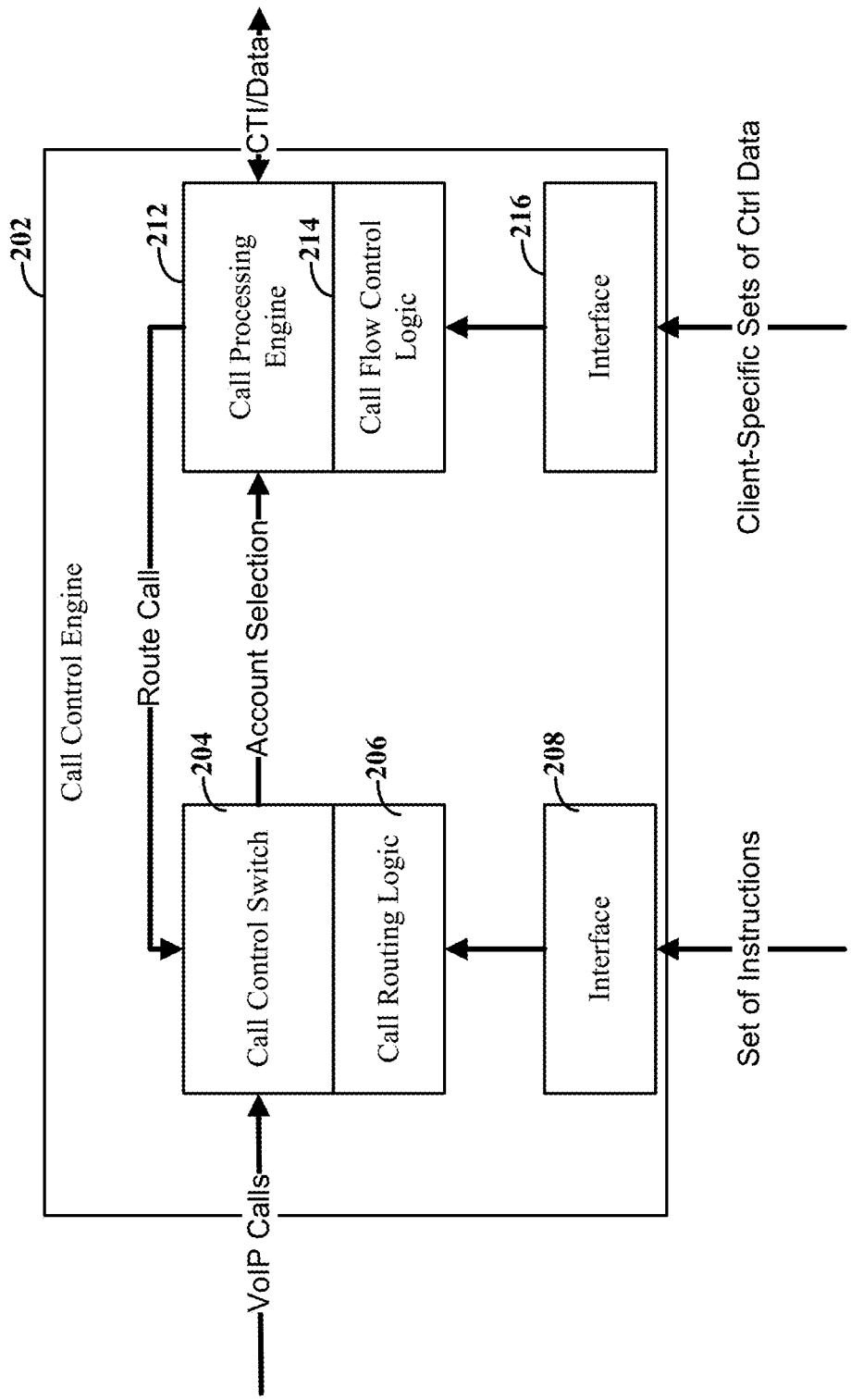
FIG. 2 is a block diagram of a call control engine with high-level programmable language logic for two different languages, consistent with embodiments of the present disclosure.

FIG. 2 is a block diagram of a call control engine with high-level programmable language logic for two different languages, consistent with embodiments of the present disclosure. When an incoming call is received by the call control engine 202, the call can first be handled by a call control switch 204. The call control switch 204 can be configured to receive and process a set of instructions that define how the call is subsequently routed. As discussed herein, the set of instructions can be written in a first programming language which provides limited access to the call routing control logic of the call control switch 204. The set of instructions can be provided by the VoIP provider through an interface 208, which provides the set of instructions to a call routing logic plugin 206. The call routing logic plugin 206 can parse and execute the set of instructions while providing a controlled access to the functions of the call control switch 204.

According to various embodiments of the present disclosure, the set of instructions provided by the VoIP provider, include a limited set of commands to the call routing logic that allows a customer to define how a call is initially routed. Maintaining the set of instructions as a limited set of simple building block commands can help with the efficiency of the call control switch. For example, the call control switch 204 can be located at the perimeter of the VoIP provider's routing network, which implies that it may be required to handle a large volume of VoIP telephone calls. The efficiency in processing the large volume of calls can have a significant impact on the performance of the system.

Consistent with various embodiments, the set of instructions specify a first level of call routing and simple call processing that are carried out by the call control switch 204. For example, a call control switch 204 may provide call routing options for multiple branch offices or locations and for multiple iPBXs that support the branch locations. Each branch and iPBX may have multiple customer (user) accounts associated therewith. The set of instructions can be used to determine the routing for a call by identifying a particular branch location, a particular iPBX and particular VoIP customer account to use in subsequent call processing and routing. The initial routing decision is indicated by the arrow labelled as "account selection," which shows the passage of control to a call processing engine 212.

The call processing engine 212 can be configured to identify and execute additional instructions that can be selected based upon the identified account, or upon similar identifying information, as provided by the call control switch 204. As discussed herein, these instructions (e.g., client-specific sets of control data) can be written in a second programming language which provides access to the call flow control logic of the call processing engine 212. In certain embodiments, the client-specific sets of control data can include commands that support contextual call routing and advanced call services. The client-specific sets of control data can be provided by a customer using an interface 216, which provides received client-specific sets of control data to a call flow control logic 214. In particular implementations, the interface 216 is configured to allow a customer to upload new client-specific sets of control data to a database 124 maintained by the VoIP provider. For each incoming call, the VoIP provider can select the appropriate client-specific sets of control data. For instance, the VoIP provider database can be organized by customer. Each customer might also have further organizational breakdowns relative to different client-specific sets of control data, such as by having different client-specific sets of control data for different branches, stores, countries, or combinations thereof.

The interface 216 can also be configured to allow client-specific sets of control data to be retrieved from a customer-managed location. For instance, the customer can provide a base set of client-specific control data that includes a URI to a customer server. The customer server can then provide client-specific sets of control data on an as needed basis for each call. The client-specific sets of control data could be loaded directly from a customer database, or they might be dynamically generated based upon data that is specific to the particular call (e.g., the called party, the called party status, or the calling party identity), or to data from other inputs (e.g., a call queue status, a status of network outages, or the like).

The call flow control logic 214 can parse and execute the client-specific sets of control data while providing a controlled access to the functions of the call processing engine 212. According to embodiments of the present disclosure, client-specific sets of control data can be associated with a particular extension account (or group of extension accounts) and can be invoked when there is an incoming call routed to the extension account. The call processing engine 212 can determine whether or not the client-specific sets of control data option has been enabled for the extension account. If enabled, the call flow control logic 214 can be called. Consistent with various embodiments of the present disclosure, the call flow control logic 214 and the call routing logic 206 are each implemented as plugin applications that interface with the call control engine according to their respective parameters, written in the respective high-level programming languages described herein.

In certain embodiments, the call processing engine 212 can have the capability to provide feedback to the call control switch 204. For example, client-specific sets of control data for a particular account may specify a condition that, if satisfied, routes a call to a different branch office. The call processing engine 212 is configurable, using one or more sets of client-specific control data, to provide an indication of a new call route decision as feedback to the call control switch 204. The call control switch 204 can respond by overriding the prior call routing decision and rerouting the call. The corresponding routing decision may then go to a different call processing engine 212, which can handle the call according to a different set of client-specific control data or the previously-used set of client-specific control data using different data to drive the call processing and routing decisions.

Consistent with various embodiments, outbound calls, or calls originating from VoIP devices supported by the call control engine 202 and the corresponding PaaS implementation, can be routed using client-specific sets of control data and the call processing engine 212.

Figure 3:
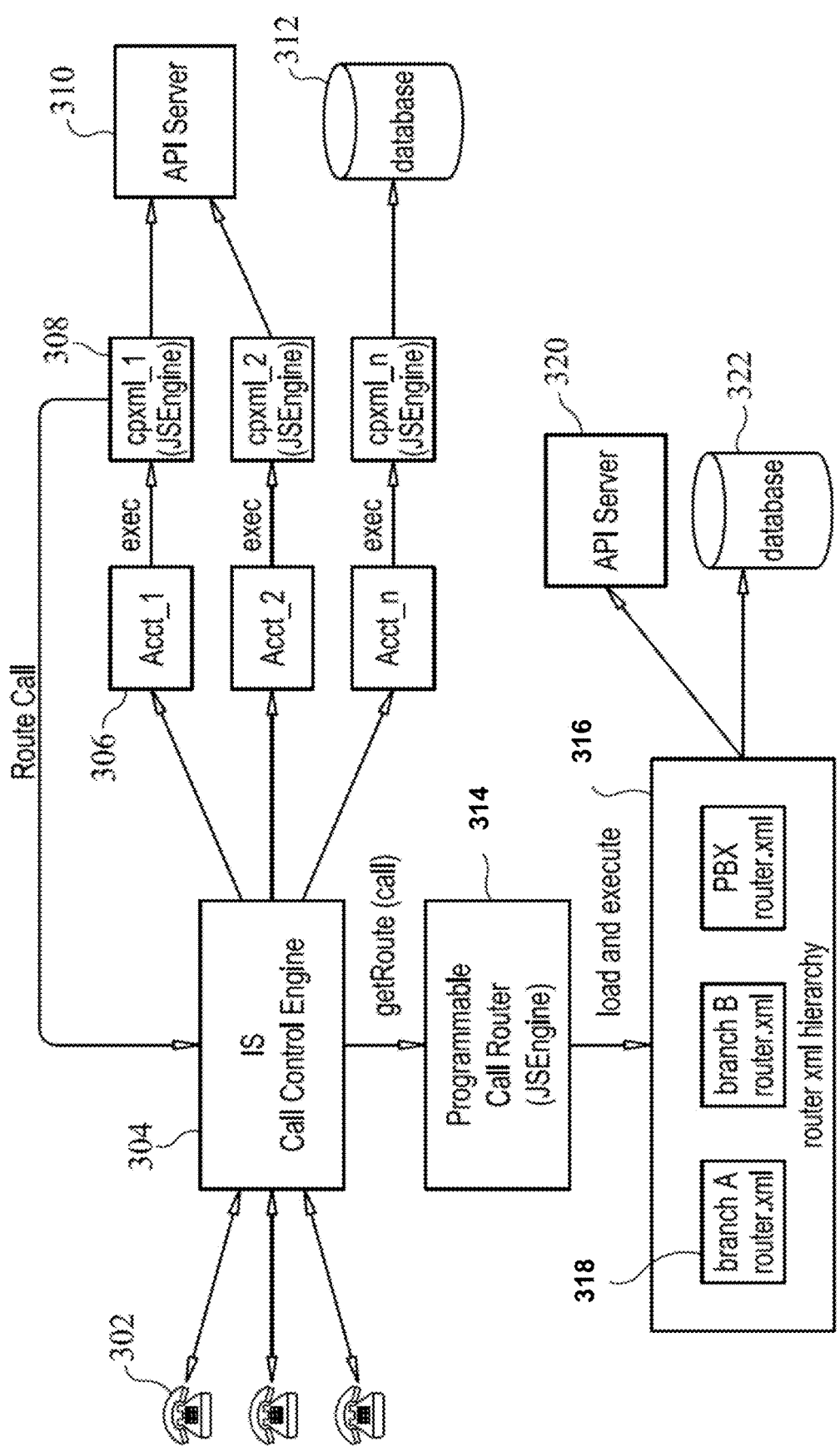
FIG. 3 is a block diagram showing a hierarchy of programmable language documents, consistent with embodiments of the present disclosure.

FIG. 3 is a block diagram showing the use of a hierarchy of programmable language documents, consistent with embodiments of the present disclosure. Call control engine 304 can provide call flow control and routing in a manner that can be consistent with discussions found herein and relating to call control engines, VoIP servers, and the other figures. Consistent with various embodiments, the call control engine 304 is an iPBX that is part of a VoIP PaaS. For instance, the iPBX can be configured using Java-based applications that manage voice over IP (VoIP) networks. The iPBX can be hosted by a VoIP service provider and located at one or more data centers. Various iPBX features can be provided, such as call forwarding, remote pickup, call routing, and voice mail.

Consistent with various embodiments, customers of a VoIP provider can use the VoIP PaaS by generating documents written in a high-level programmable language. The documents specify how the customer would like call intercept to be handled for both inbound and outbound calls. For instance, a client-specific sets of control data 308 can be associated with an extension account 306, or with groups of extension accounts. The extension accounts 306 can represent a specific individual and their associated extension number(s). Client-specific sets of control data 308 that are configured in this manner will be invoked by the call control engine 304 after an incoming call is routed to an extension that has capabilities enabled to receive control data written in the high-level programming language. Client-specific sets of control data can also be used for call flow processing of outbound calls. The client-specific sets of control data may provide logic for sophisticated call flow functions for outbound calls. For example, messages (e.g. text messages and email messages) can be automatically generated in response to outgoing calls and restrictions can be placed on outbound calls based upon factors such as time of day or call history. Another set of client-specific control data could implement auto attendants that are each specific to particular routing decisions.

The call control engine 304 may also consult with call routers 314. The call routers can be programmed using set of instructions 318, and with JavaScript for dynamic data access and logic handling. The set of instructions 318 can be arranged in router xml hierarchy 316, which can specify different sets of instructions 318 depending upon the branch or iPBX that is identified as corresponding to the call. Once the call router documents are loaded, they can be cached in memory and used by the call control engine 304 to make a routing decision. When a call is routed through the call control engine 304, the call control engine can consult with high-level sets of instructions. The branch level can be identified, for example, based on the branch Id of caller (for outbound calls) or callee (for inbound calls). Delineations other than the branch are also possible, such as by the called country, the particular store, the state, or other. If a route result is not determined, the call control engine 304 can also consult with PBX-level sets of instructions to obtain routing decisions. Examples of a route result from a script are "Accept", "Reject", or "NewRoute." Thus, the programmable call router module 314 provides the call control engine 304 with the ability to handle call intercept/filter reject or re-route the call to a different target destination.

The call router module 314 can also interact with a client-specific sets of control data to handle sophisticated call flow scenarios where the call routing is changed after the initial determination. For example, the client-specific sets of control data can include commands (e.g., "reroute") that the call control engine 304 uses to provide feedback to the programmable call routers 314, which use set of instructions for initial routing decisions. This might allow, as an example, a routing decision based on the set of instructions provided by the VoIP provider to be overridden by the client-specific sets of control data.

According to particular embodiments, the programmable call routers (using set of instructions provided by the VoIP provider) 314 can be viewed as plugins to the call control engine 304. The call router plugins may have two levels— Branch and PBX levels. The call router supports defined structures that specify how the PaaS can be utilized by a customer. For example, the sets of instructions provided by the VoIP provider can define sets of conditional statements, data access requests, and call routing commands: if/else, condition, goto, log, var, script, query, data, accept, reject, route statements, or other similar commands. In particular embodiments, the sets of instructions provided by the VoIP provider can be considered a subset of client-specific sets of control data by containing a part, but not all, of the client-specific sets of control data call flow commands. This distinction can be useful for keeping the instructions provided by the VoIP provider light weight so that call routing decisions are simplified and efficient. More complex tasks, such as the use of media and advanced call handling, can be handled using client-specific sets of control data. Using such programmable call routes, a few example uses include: school district that generates SMS/Email notifications to parents whenever an emergency number is dialed; off hour restriction of outbound call with client-specific sets of control data; call center lockdown to provide outbound dialing restriction for phones; computer initiated dialing with caller identification (ID) override based destination database table, and call return to target DID/agents; and implementation of a call black list (denying calls to/from the list) or white list (allowing calls to/from the list) with potentially large lists and dynamic updating capabilities.

Consistent with embodiments of the present disclosure, both the set of instructions and the client-specific sets of control data provide the capability of handling dynamic data from multiple sources. Examples of these sources are depicted as application program interface servers 310, 320 and databases 312, 322. The dynamic data can therefore be provided from a variety of sources including, but not necessarily limited to, call route session data (caller id, callee id, or route from/to), query custom object (to a database) in the VoIP provider system/cloud, and access data through HTTP RESTful API. For instance, the set of instructions and/or the client-specific sets of control data can include a web resource that is identified by Uniform Resource Identifiers. The web resource might be a customer HTTP server that responds to a conditional query (e.g., whether or not a call queue is above a threshold) with client-specific sets of control data that instructs the call control engine on how to route, or otherwise handle, the call.

Figure 4:
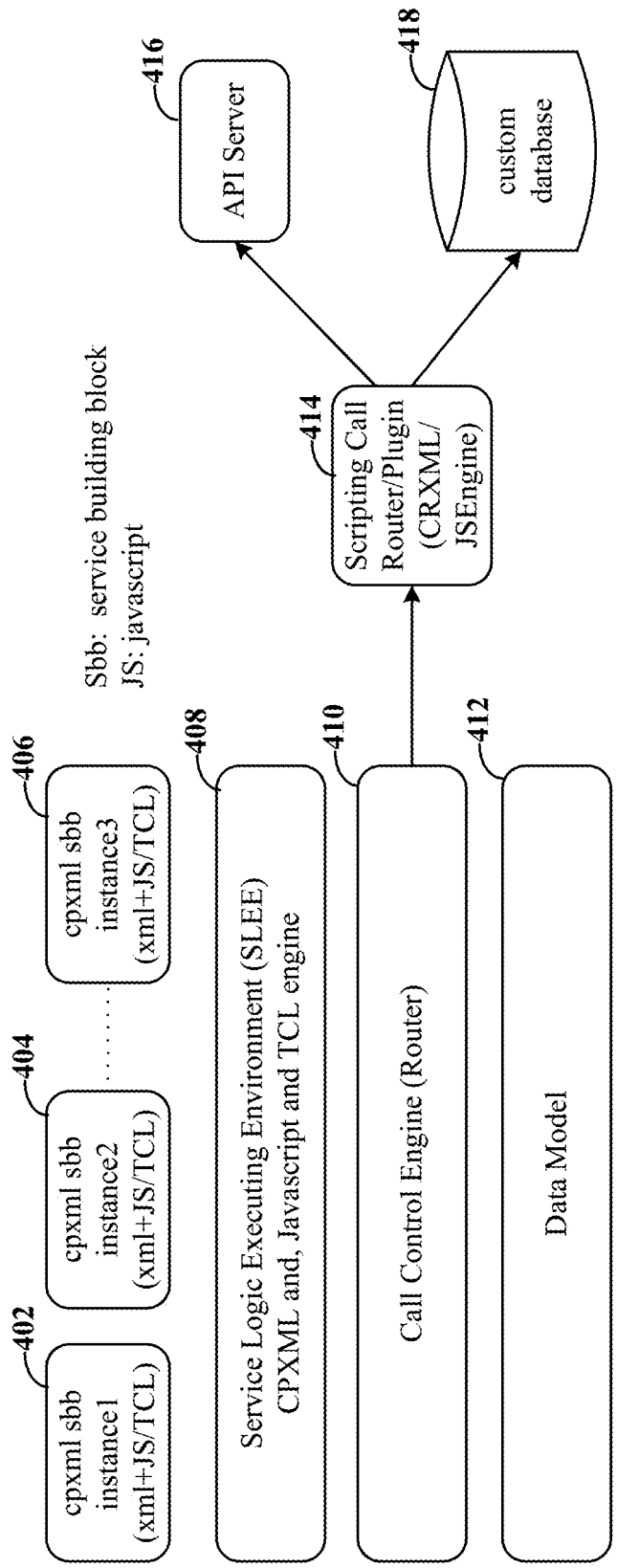
FIG. 4 is a block diagram that shows multiple conceptual layers in a call control system, consistent with embodiments of the present disclosure.

FIG. 4 is a block diagram that shows multiple conceptual layers in a call control system, consistent with embodiments of the present disclosure. The depicted configuration shows three sources of client-specific sets of control data 402, 404, 406. The service logic executing environment 408 access and executes the client-specific sets of control data 402, 404, 406. The client-specific sets of control data can be embedded as part of other call flow solutions (e.g., as part of a CTI solution), loaded locally from each of the call control servers 410 or iPBXs, or loaded from a remote web application server 416 (e.g., using with HTTP(s) protocol). The integration of the layers facilitates the ability of a developer to use the (iPBX) data model 412, provider-hosted database(s) 418, third-party application servers 416 and third-party database(s) 418 to drive business and call flow logic and to integrate telecommunication with other capabilities and services.

Figure 5:
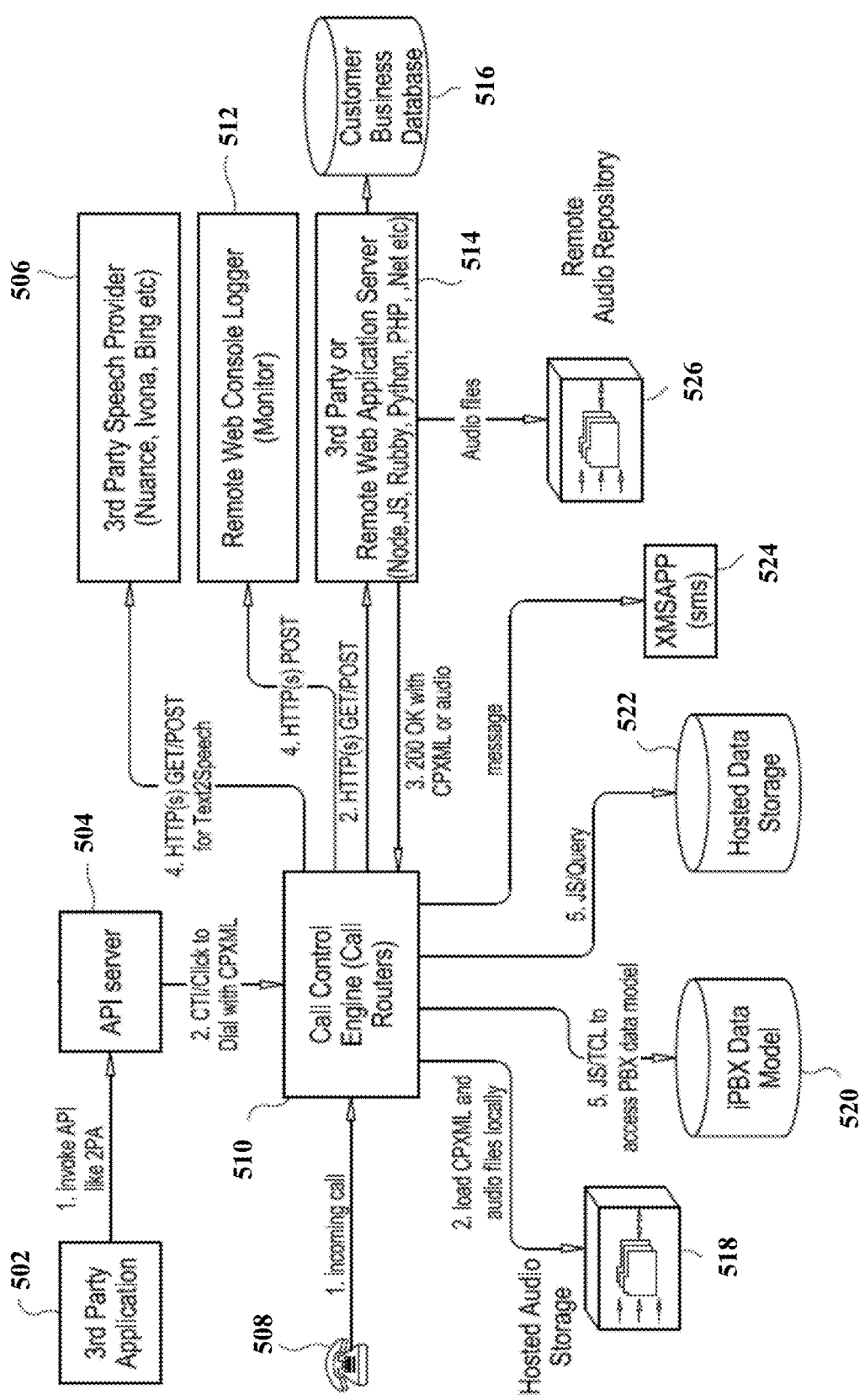
FIG. 5 is a block diagram showing interconnections to a call routing switch, consistent with embodiments of the present disclosure.

FIG. 5 is a block diagram showing interconnections to a call routing switch, consistent with embodiments of the present disclosure. As a particular, non-limiting example, an incoming call, from a telephone device 508, is received by the call control engine 510. The call control engine 510 can use the call destination to invoke a proper VoIP call services (e.g., CTI functionality), which in some instances can be provided by a third party application server 502 through a VoIP provider's API server 504. The client-specific sets of control data can be embedded within the CTI service data. Alternatively, client-specific sets of control data can be loaded from a database 522, which might be hosted by the VoIP provider as part of the PaaS solution. A third option is for the client-specific sets of control data to be retrieved from a customer database 516. For example, the client-specific sets of control data could be retrieved using an HTTP connection to a web application server 514. At the same time that the client-specific sets of control data are retrieved, additional information can also be provided, such as audio files 518, 526. The audio files could be used for various purposes, such as for implementing an auto attendant feature.

In various embodiments, a customer can use databases and other data sources that are offered by the VoIP provider without having direct access to the data. Rather, the customer can use the client-specific sets of control data to generate queries that identify a data source and a conditional response based upon the query results. The call control engine can carry out the conditional response based upon the results of the query without the customer every receiving, or otherwise having access to, the data driving the conditional response. A particular example might be a query to a call analytics database for the VoIP provider. A customer could be given the limited, indirect access to the database through client-specific sets of control data-driven queries while the VoIP provider maintains control over the proprietary contents of the database. Moreover, the database might contain information about individual callers that would raise privacy concerns.

In some instances, the customer can provide the data sources to the VoIP provider and the call control engine without providing direct access to the data. For example, the customer can specify, in client-specific sets of control data, a URI that points to a customer-provided server and an associated query. The customer-provided server can execute, for example, a local script that may rely upon customer data. The script can generate a response in the form of client-specific sets of control data. The call control engine can then carry out call routing, or other functions, based upon the response and without ever having direct access to the customer data.

In certain embodiments, the call control engine 510 can provide call processing information to a monitor server 512 (e.g., a remote web console-logger application). The call control engine 510 can then execute the client-specific sets of control data. In an example implementation, the client-specific sets of control data might invoke various other services, such as a text-to-speech application 506. For example, a client-specific sets of control data might specify that a string of text be converted to speech using a corresponding command (e.g., "<say>Hello, please hold.</say>"). The client-specific sets of control data can also request access to various other data sources, such as iPBX data model 520 and a hosted data storage 522. Further, the client-specific sets of control data can specify that an SMS/MMS text message be sent using XMSApp 524 or generate new calls (e.g., for call conferencing or call forking). The provided examples of capabilities using client-specific sets of control data are not limiting.

Figure 6:
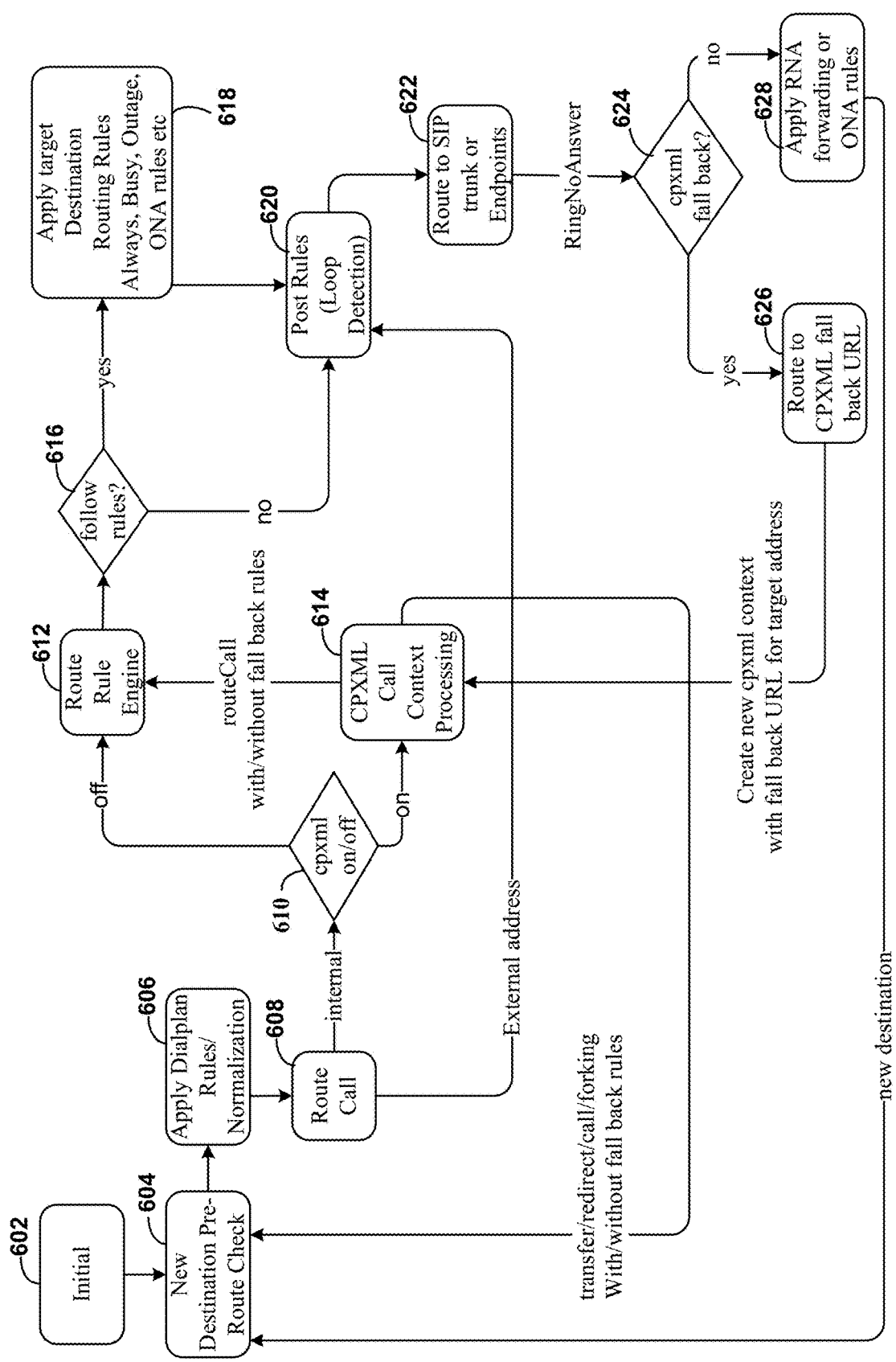
FIG. 6 is a flow diagram for a call routed by a call control engine, consistent with embodiments of the present disclosure.

FIG. 6 is a flow diagram for a call routed by a call control engine, consistent with embodiments of the present disclosure. At block 602 a call is initially received by a call control engine. The call control engine then can apply an initial dial plan to route the call, per block 608. Consistent with certain embodiments, the initial dial plan can indicate whether the call is routed within the VoIP provider's network or to an external (SIP) address or telephone number. If the call is routed externally, then the call control engine can implement post-call processing rules, per block 620. For instance, the call control engine can perform loop detection to prevent call loop conditions for call routing. The call control engine can then route the call to an SIP trunk or to particular endpoint devices, per block 622. If the call is not successfully connected or answered, then the call control engine can be configured to check for client-specific sets of control data that might specify how to then handle the call, per block 624. If found, the client-specific sets of control data can be parsed and processed, per block 626. If none exist, ring-not-answered (RNA) forwarding rules or one number access (ONA) rules are then applied, per block 628.

If the call is internal, then the call processing engine checks whether client-specific sets of control data are enabled for the particulars of the call, per block 610. For example, client-specific sets of control data can be enabled based upon the customer account associated with the called number (e.g., as indicated by the DID number or extension). If client-specific sets of control data are not enabled, a route rule engine can be invoked, per block 612. The call control engine next determines whether or not there are any special call processing rules to implement, per block 616. If not, then the call can be routed without further processing. If so, then the corresponding call processing rule(s) can be invoked, per block 618. The call processing rules might include, for example, specialized routing rules that route the call to different destinations depending upon the status of an endpoint specified by called number. This might include call forwarding that is always implemented, or that is implemented when a destination line is busy or subject to a network outage that renders the corresponding endpoint device unreachable.

According to various embodiments of the present disclosure, the call control engine can use client-specific sets of control data to control the processing of the call, per block 614. As discussed herein, the source of the documents with the client-specific sets of control data can vary according to the particular implementation.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (VoIP) endpoint device (or endpoint) includes a communication circuit and (computer) processing circuits which are configured to establish (VoIP) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A system including a data-communications server operable by a data-communications provider to provide data communications services to respective client entities, the respective client entities having respectively associated client-specific computer circuitries for communicating with the data-communications server, the system further comprising:

call flow circuitry, coupled to the data-communications server, to receive respective first sets of scripts from corresponding ones of the client-specific computer circuitries, wherein each of the first sets of scripts has call flow instructions written in a programming language, is provided over a broadband network on behalf of a corresponding one of the respective client entities, and indicates a flow for calls according to the respective data communications services to be provided for the respective client entity; and computer processor circuitry, coupled to the call flow circuitry and the data-communications server, to:

identify, in response to received calls from endpoint devices, a second set of scripts having instructions written in a related programming language, wherein the second set of scripts includes call routing commands for designating a specific set of the respective data communications services for which the received calls are associated and provided by the data-communications provider; and execute the first and second sets of scripts to control, in response to the data, call flow and call routing for the received calls according to the respective data communications services to be provided for the respective client entity, the call routing commands and the call flow instructions.

2. The system of claim 1, further including a data-communications provider database including client-specific sets of control data specified by the call flow instructions associated with the respective client entity.

3. The system of claim 1, wherein the data-communications server is to provide an interface for updating the respective first sets of scripts including the call flow instructions provided on behalf of the respective client entity and without allowing the respective client entity access to the call routing commands, thereby preventing the respective client entity from changing the call routing commands through the respective first sets of scripts.

4. The system of claim 1, wherein the server is to respond to instructions specified in one of the first sets of scripts, by generating database queries to a database associated with the respective client entity of the data-communications provider.

5. The system of claim 4, wherein the database queries are conditional queries and the data-communications server is to provide call control functionality in response to received conditional responses to the queries and without direct access to private data stored by the client entity.

6. The system of claim 1, wherein the programming languages are related to one another in that one of the programming languages is a subset of the other of the programming languages, and one of the programming languages has capacity to provide more levels or aspects of call routing and processing.

7. The system of claim 1, further including logic circuitry having an interface for updating, while the data-communications server continues to receive the calls, another of the first set of scripts with call flow instructions or with call routing commands.

8. The system of claim 1, further including a data-communications provider database and including logic circuitry which is to: provide a clientele-directed interface for updating another of the first set of scripts with call flow instructions or with call routing commands; and allow the respective client entity to update the first set of scripts by uploading files to the data-communications provider database.

9. The system of claim 1, wherein the programming languages are related to one another in that one of the programming languages is more capable of providing additional levels or aspects of call routing and call processing.

10. The system of claim 1, wherein the call routing for the received calls is associated with a routing decision to identify an account of the respective client entity and a level of the first set of scripts based upon the account, wherein the level of the first set of scripts specifies information associated with at least one of: complexity of media functionality associated with the respective client entity; and evolving demands associated with or expected by the respective client entity.

11. The system of claim 1, wherein the computer processing circuitry is to facilitate scalability of the system for the respective client entities in terms of the respective client entities being: of different volumes of associated endpoint devices and/or end-users; and/or of different complex organizational structures that have corresponding complex call routing requirements.

12. The system of claim 1, wherein the call routing for the received calls is associated with a routing decision to identify a particular store of a customer of the data-communications provider.

13. The system of claim 1, wherein one of the programming languages includes commands that override routing decisions corresponding to execution of the call routing commands.

14. The system of claim 1, further including the client-specific computer circuitry, wherein each of the client-specific computer circuitry is to communicate with the data-communications server via the broadband network.

15. A method for use in a system having a data-communications server operable by a data-communications provider to provide data communications services to respective client entities, the respective client entities having respectively associated client-specific computer circuitries for communicating with the data-communications server, the method comprising:
receiving, via call flow circuitry that is coupled to the data-communications server, respective first sets of scripts from corresponding ones of the client-specific computer circuitries, wherein each of the first sets of scripts has call flow instructions written in a programming language, is provided over a broadband network on behalf of a corresponding one of the respective client entities, and indicates a flow for calls according to the respective data communications services to be provided for the respective client entity; and
via computer processor circuitry, coupled to the call flow circuitry and the data-communications server:
identifying, in response to received calls from endpoint devices, a second set of scripts having instructions written in a related programming language, wherein the second set of scripts includes call routing commands for designating a specific set of the respective data communications services for which the received calls are associated and provided by the data-communications provider; and
executing the first and second sets of scripts to control, in response to the data, call flow and call routing for the received calls according to the respective data communications services to be provided for the respective client entity, the call routing commands and the call flow instructions.

16. The method of claim 15, wherein the call routing for the received calls is associated with a routing decision to that identifies a particular store of the respective client entity.

17. The method of claim 15, wherein the second set of scripts is to specify call attendant functions for the respective client entity.

18. The method of claim 15, wherein the first and second programming languages are each an extensible markup language, and wherein the second programming language includes commands that override the routing decisions corresponding to execution of the first set of scripts.

19. The method of claim 15, wherein routing-decision information and call-processing data are specific to needs of the respective client entity; and further including
the server generating, in response to the calls, generating data/call-routing commands based on one of the programming languages,
using data/call-routing commands received via certain of the calls at the server to effect changes or updates of the routing-decision information and call-processing data, wherein the changes or updates of the routing-decision information and call-processing data are also specific to needs of the respective client entity.

20. A storage device including instructions which, in response to being executed by computer circuitry, causes a set of steps to be performed as follows:
receiving, via call flow circuitry that is coupled to a data-communications server, respective first sets of scripts from corresponding ones of client-specific computer circuitries, wherein each of the first sets of scripts has call flow instructions written in a programming language, is provided over a broadband network on behalf of a corresponding one of respective client entities, and indicates a flow for calls according to respective data communications services to be provided for a respective client entity, via respectively associated client-specific computer circuitries, from among a plurality of client entities; and
via computer processor circuitry, coupled to the call flow circuitry and the data-communications server:
identifying, in response to received calls from endpoint devices, a second set of scripts having instructions written in a related programming language, wherein the second set of scripts includes call routing commands for designating a specific set of the respective data communications services involving the received calls; and
executing the first and second sets of scripts to control, in response to the data, call flow and call routing for the received calls according to the respective data communications services to be provided for the respective client entity, the call routing commands and the call flow instructions.

* * * * *